Nov. 23, 1943.  J. C. PATTERSON, JR  2,335,079
AUTOMATIC TENSION HOIST EQUIPMENT
Filed Feb. 20, 1942  7 Sheets-Sheet 1

Inventor
Joseph C. Patterson, Jr.
By Stevens and Davis
Attorneys

Nov. 23, 1943.　　　J. C. PATTERSON, JR　　　2,335,079
AUTOMATIC TENSION HOIST EQUIPMENT
Filed Feb. 20, 1942　　　7 Sheets-Sheet 3
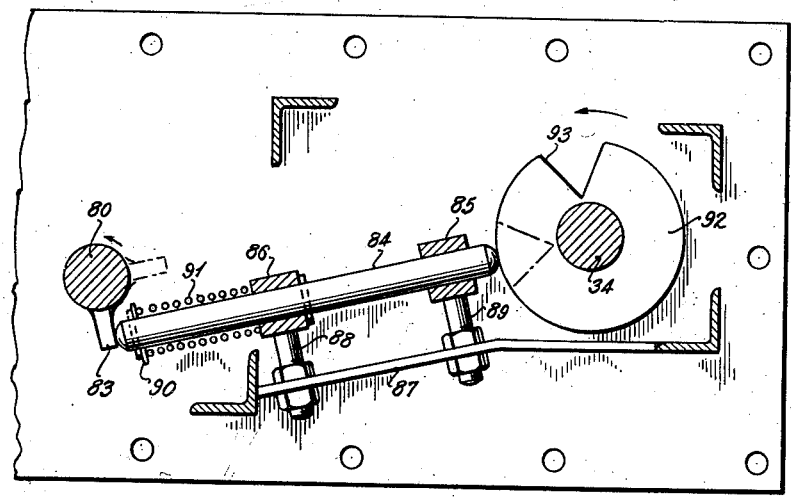
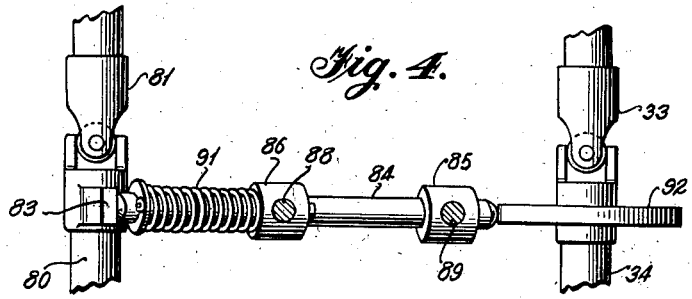
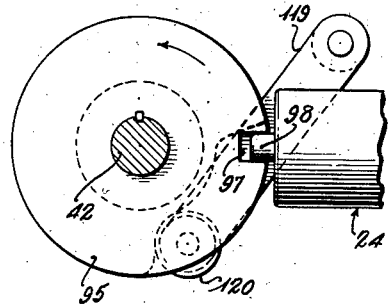
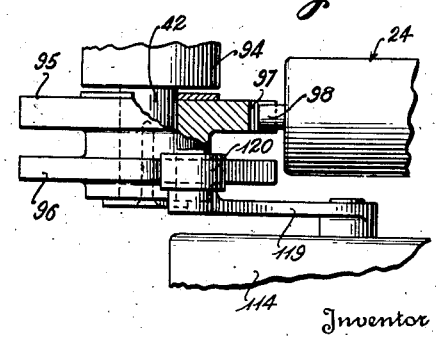
Inventor
Joseph C. Patterson, Jr.
By Stevens and Davis
Attorneys Inventor
Joseph C. Patterson, Jr.
By Stevens and Davis
Attorneys

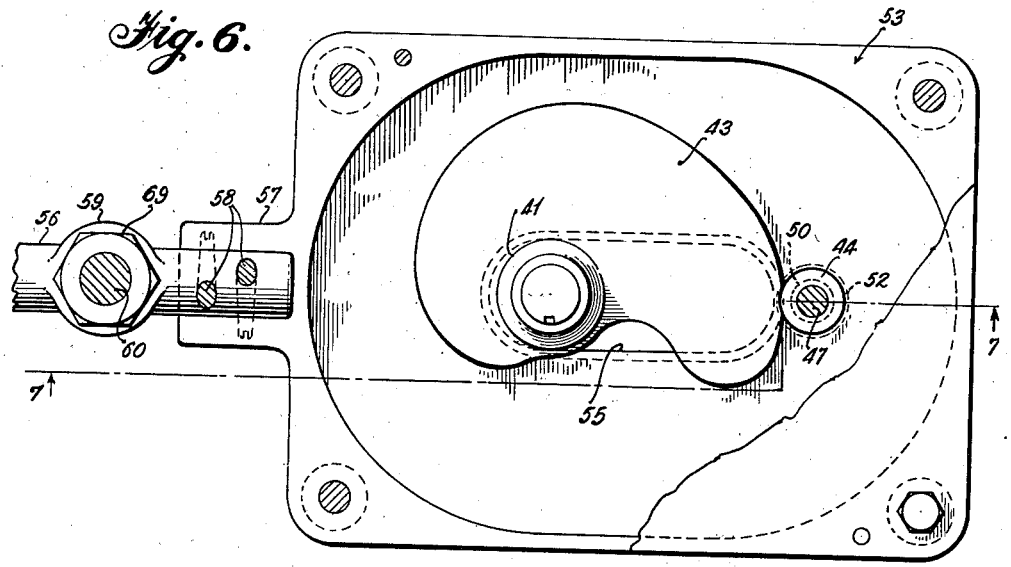
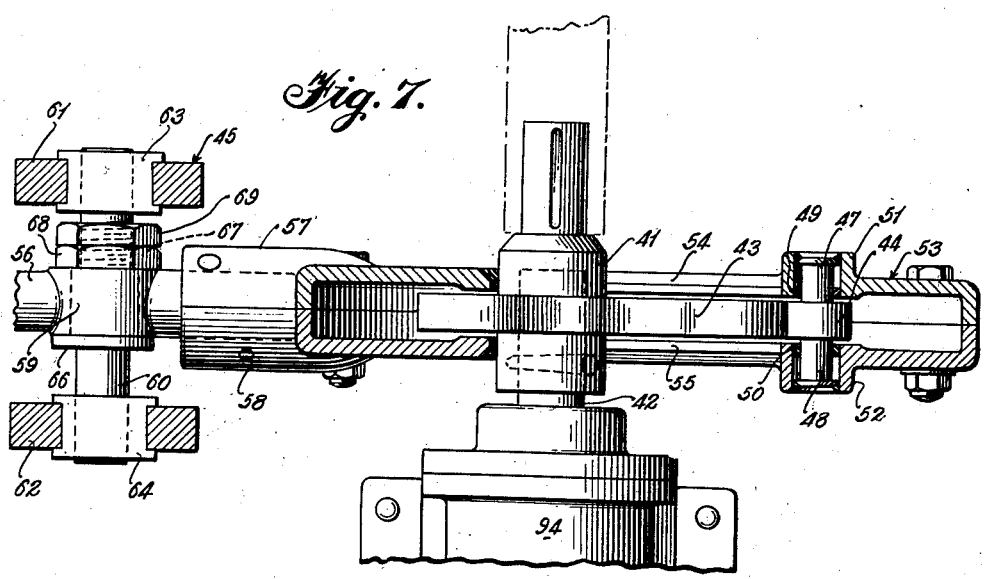

Nov. 23, 1943.   J. C. PATTERSON, JR   2,335,079
AUTOMATIC TENSION HOIST EQUIPMENT
Filed Feb. 20, 1942   7 Sheets-Sheet 6

Inventor
Joseph C. Patterson, Jr.
By Stevens and Davis
Attorneys

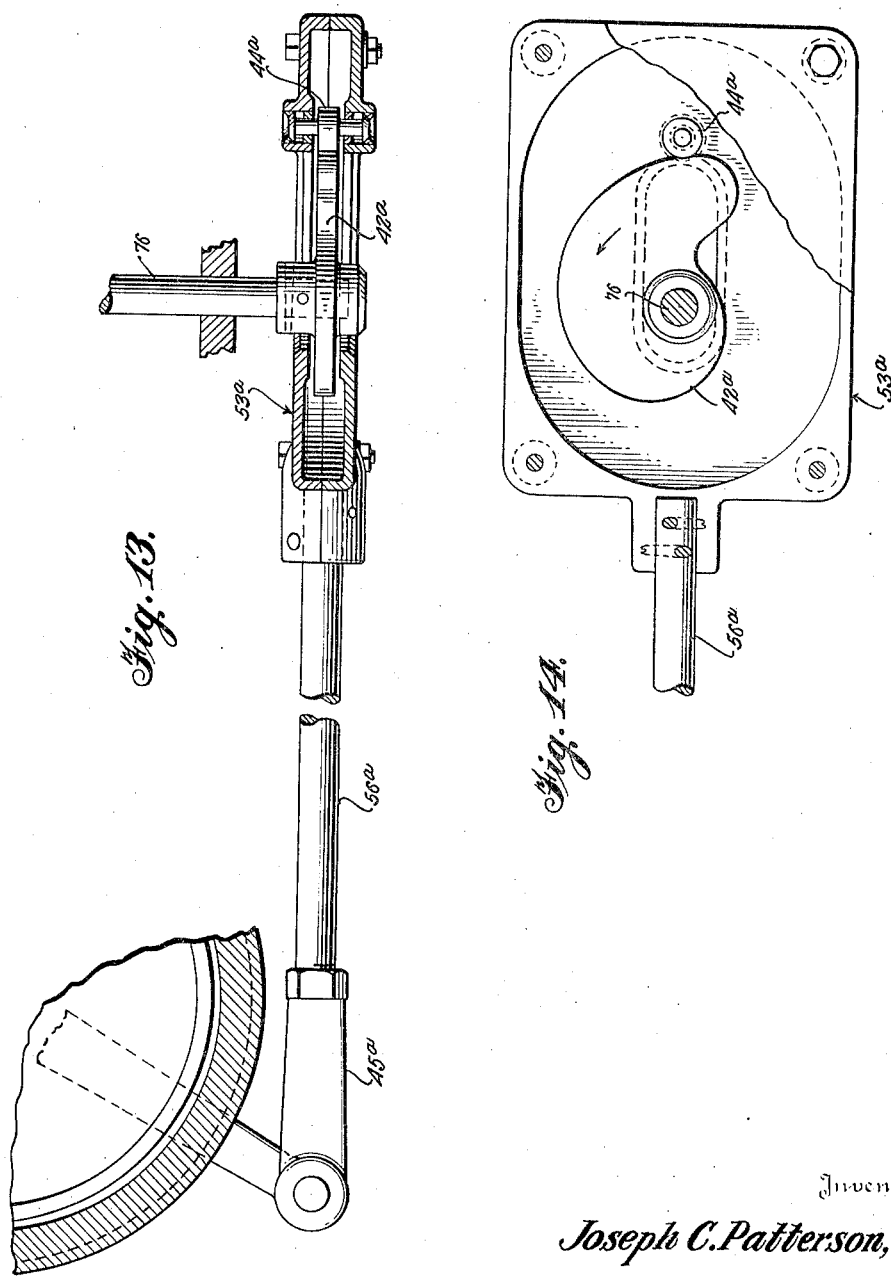

Patented Nov. 23, 1943

2,335,079

UNITED STATES PATENT OFFICE 2,335,079

AUTOMATIC TENSION HOIST EQUIPMENT

Joseph C. Patterson, Jr., Alexandria, Va.

Application February 20, 1942, Serial No. 431,769

11 Claims. (Cl. 254—172)

This invention relates to hoisting equipment and is more particularly concerned with apparatus of the type disclosed and claimed in Patent 2,042,480 to Joseph C. Patterson.

Apparatus of the type constituting the subject matter of Patterson Patent 2,042,480, although of general utility, finds its chief employment in the hoisting of ship-borne aircraft from a seaway onto the deck of a vessel. Because of the relative fragility of aircraft, precautions of a most elaborate nature are necessary in order to prevent accidents in which the life of a pilot might be lost or much expensive equipment damaged. These precautions are of two general types, one concerned with the prevention of shock in normal operation and the other with the prevention of accidental misuse of the complex controls necessary for the safe application of hoisting force.

In the category of shock prevention considerable progress has been made by the employment of special hydraulic transmissions interposed between the cable hoisting drum and the prime mover. Such transmissions afford means for the smooth and even application of power to the hoist drum and hence to the cable actuated thereby and its fragile load. When hoisting from a seaway, however, the problem is complicated by wave action which brings about relative movement between the ship and load both before and immediately after raising of the load is commenced. Heretofore the dangers incident to relative movement have been partially eliminated by the use of load sensitive automatic stroke accelerating devices in conjunction with the "B" or motor end and "A" or pump end of the hydraulic transmission. These devices function to automatically increase motor end speed when the load being lifted is raised by a wave at a rate in excess of the drum controlled takeup speed of the cable. In this way slack, with the incident danger of shock upon its removal is, to a certain extent, eliminated during the actual hoisting. During the period after the cable is attached to the load and before hoisting is commenced when no driving connection between the motor end of the transmission and the cable drum exists, the hoisting cable may be very satisfactorily maintained free of slack by the employment of an automatic tensioning device such as that shown in Joseph C. Patterson Patent 2,042,480.

In the category of accidental misuse prevention there has been less activity, although it is now customary to provide the cable drum with an emergency brake which will serve to immobilize the same under emergency conditions.

Despite the foregoing precautions, there are phases of conventional airplane hoist operation which still inherently involve serious dangers, particularly when it is borne in mind that it may, at times, become necessary to use the hoist equipment under battle conditions or in adverse weather. Thus, although a drum emergency brake is ordinarily provided to immobilize the cable drum and hold a load in any position required by emergency conditions, it is evident that the accidental release of this brake, when the hoisting drum is not being otherwise held with a load on the line, may result in a serious and costly accident. Similarly, an accident can occur if the driving connection between the hoisting drum and its prime mover is accidentally severed during a hoisting or lowering operation.

Another difficulty which has been encountered arises in connection with the elimination of cable slack during the initial part of a hoisting operation where wave action causes the load to rise at a rate in excess of the takeup speed of the cable drum. While automatic hydraulic transmission accelerating devices assist in the elimination of such dangerous slack, it has been found that there is a slight time lag between the occurrence of the slack and the effective increase in motor end speed. As a result of the time lag, enough slack may be existent by the time the cable drum has reached the proper speed so that its elimination may be accompanied by a serious shock.

It is therefore an object of this invention to provide more reliable automatic tension airplane hoist equipment free of the foregoing difficulties and characterized in operation by an exceedingly smooth hoisting cycle, regardless of any existing relative movement between the load and the cable drum either before or during the lifting operation.

According to this invention, it is contemplated that the cable drum emergency brake may not be released except when a driving connection exists between the prime mover and the cable drum and the driving connection may not be severed so long as there is a load on the hoist line which will be evidenced by a relatively high pressure in the line running between the pump and motor ends of the hydraulic transmission.

It is a further object of this invention to provide means brought into action automatically for supplementing the known hydraulic motor accelerating devices to insure a sufficiently rapid cable takeup speed in the event cable-borne aircraft is raised or overtaken by a wave after hoisting has been commenced, such means additionally serving to maintain the hoisting cable taut during the period after attachment of the cable to the load and before hoisting is initiated.

Other objects and advantages of the invention will be apparent from a consideration of the following detailed description of a preferred embodiment thereof in conjuction with the annexed drawings wherein:

Figure 3 is a view in section taken along the line 3—3 of Figure 2;

Figure 4 is a view in elevation of the parts shown in Figure 3;

Figure 6 is a plan view of the clutch operating cam assembly;

Figure 7 is a view partially in section and partially in elevation taken along the line 7—7 of Figure 6;

Figure 8 is a plan view of the interlocks carried on the shaft of the clutch operating cam;

Fig. 9 is a view in elevation of the elements of Figure 8;

Figure 13 is a view partially in elevation and partially in section of the brake operating cam illustrating the connection between the cam follower and the operating link of the brake; and Figure 14 is a top plan view of the brake operating cam and its follower mechanism.

Figure 1:
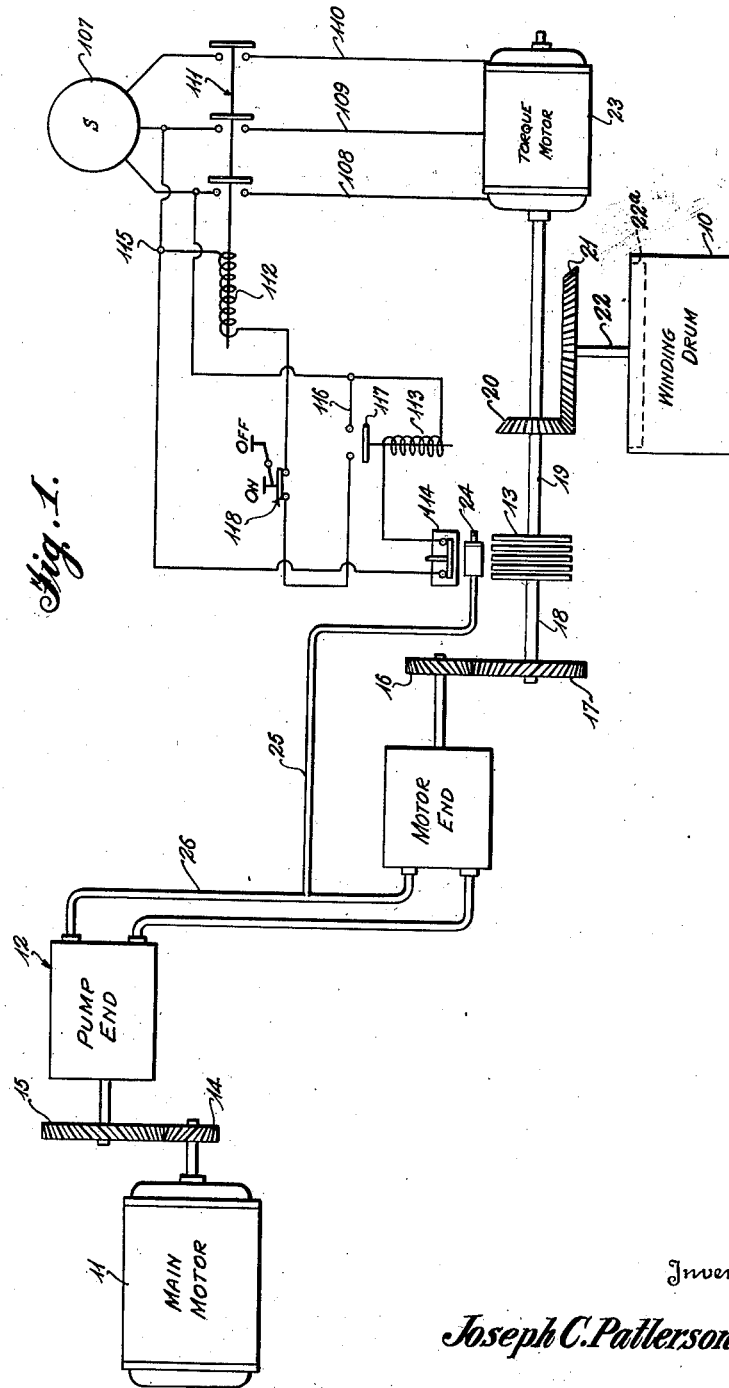
Figure 1 is a schematic illustration of a hoist drum operating system showing the relative positions of the improvements afforded by this invention.

Referring first particularly to Figure 1, the numeral 10 designates a winding drum of conventional form adapted, when driven, to pay out and hoist a cable over a boom, not shown, so that lifting and lowering operations may be performed. Drum 10 is driven in the usual way from an electric motor 11 through a hydraulic transmission 12, a normally engaged friction clutch 13 being interposed between the hydraulic motor or "B" end of transmission 12 and said drum. Suitable driving connections are, of course, interposed between motor 11 and the pump end of transmission 12 as well as between the motor end of said transmission and clutch 13. In the former case, the shaft of motor 11 carries a gear 14 which meshes with and drives gear 15 carried on the shaft of the pump end of transmission 12, while in the latter a gear 16 on the shaft of the motor end of transmission 12 meshes with and drives a gear 17 mounted on a shaft 18 leading to the driving side of clutch 13. The driven side of clutch 13 is carried on a shaft 19 which likewise supports driving gear 20 which meshes with driven gear 21 on drum shaft 22.

It will be recognized that the elements just described are conventional, it being contemplated that transmission 12 be of the general type shown in Patent 924,787 to Reynold Janney, provided with accelerating devices of the general type shown in Patent Re. 20,551 to W. E. Rouse. The clutch 13 may be of the general type shown in Patent 1,392,932 to Harrie Giffin. It is further contemplated that the drum 10 be provided with an internal brake 22a of any conventional construction for example of the type shown in Patent 1,453,126 to W. G. Bryan.

As shown in Patent 2,042,480 to present applicant, a torque motor 23 is connected to shaft 19 and serves when energized to drive the same only in a hoisting direction to take up slack cable resulting from relative movement between ship and sea after a cable hook has been attached, the power being insufficient to raise a load. This operation is known as automatic tensioning and is fully explained in Patent 2,042,480.

It is proposed as an important part of this invention to so control the operation of the elements described above as to substantially increase the safety factor while concomitantly improving the smoothness of operation particularly in operating clutch 13 and in hoisting from a rough seaway. To this end an interlock, to be hereinafter more fully described, is provided between the operating means for the emergency brake 22a on drum 10 and that for clutch 13 so that brake 22a may be set at any time but may be released only when clutch 13 is engaged to drive shaft 19. Also associated with the operating means for clutch 13 is a pressure operated interlock 24, shown schematically in Figure 1, which prevents release of the clutch when hydraulic pressure in excess of a predetermined value exists between the pump and motor ends of transmission 12. For this purpose, interlock 24 is connected to a conduit 25 in communication with fluid line 26 running from the pump to the motor end of transmission 12. It is evident that the locking of clutch 13 in engaged position will occur when a load is on the cable operated from drum 10 while in paying out or hoisting an empty hook the pressure in line 26 will be so low that interlock 25 will not be actuated. The pressure operated interlock 24 operates on a pressure value approximating 300 pounds per square inch so that clutch 13 is locked in engaged position when a load such as an airplane is being handled.

From the foregoing it can be seen that when the brake 22a acting upon drum 10 is not in holding position any load on the hoist line will be protected by the engaged clutch 13 which may not be released unless the pressure in line 26 is relieved.

Figure 2:
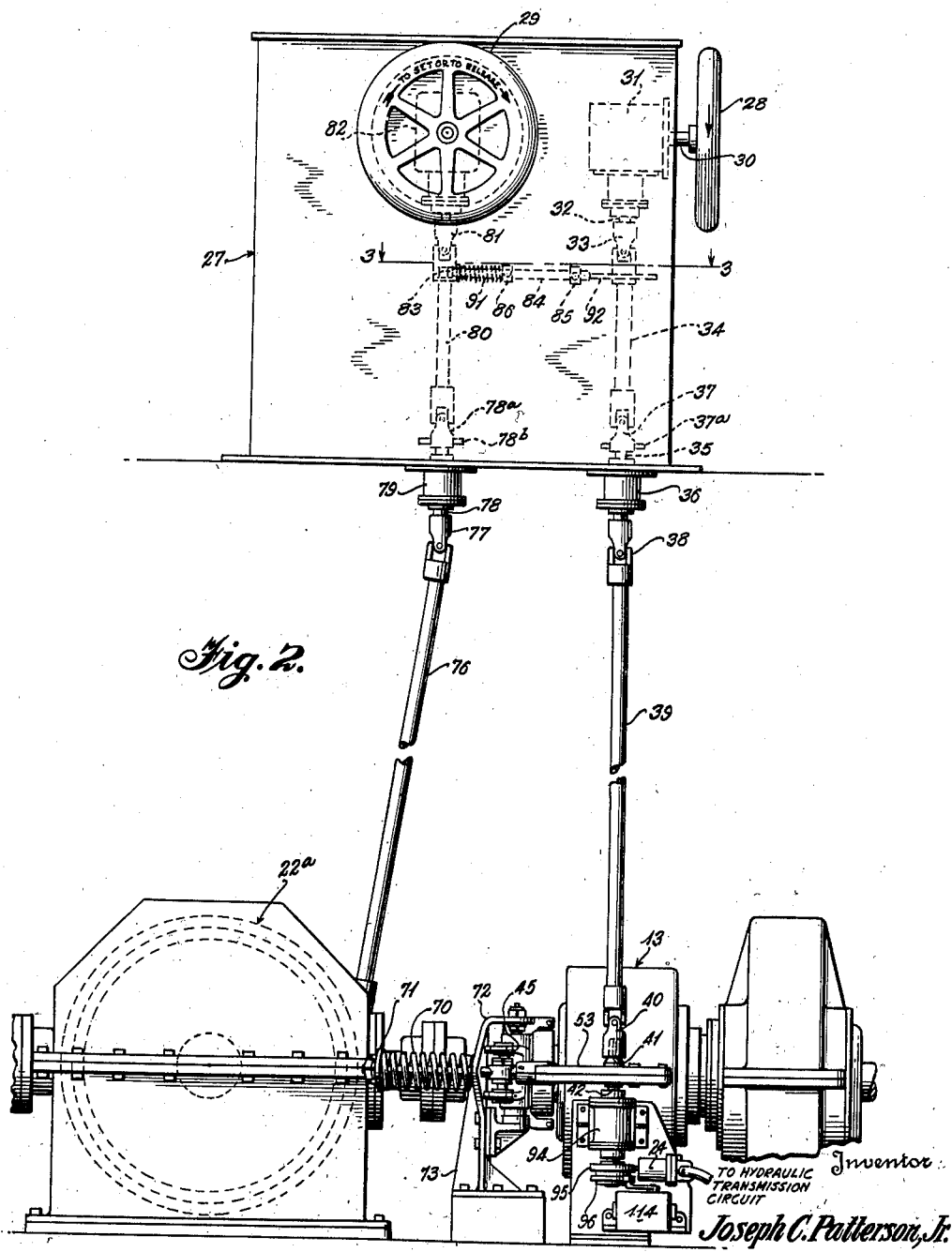
Figure 2 is a view in elevation of the control station for the operation of the clutch and hoist drum brake including various details of the clutch operating mechanism.

On shipboard it is, of course, customary to place all controls on deck at a convenient location where they may be operated by the appropriate officer. Hence a housing 27, shown in Figure 2, is usually provided and equipped with hoisting apparatus controls constructed according to this invention so that switch operating buttons and various handwheels may be conveniently located. Although it is contemplated that housing 27 accommodate handwheels for the operation of transmission 12 as well as a switch button for operating motor 11, only two handwheels 28 and 29 are illustrated. Of these, handwheel 28 is for the control of clutch 13 while handwheel 29 is for the operation of drum brake 22a.

A shaft 30 is connected to handwheel 28. This shaft is supported in suitable bearings, not shown, and extends into gear box 31 where it is connected by bevel gears of conventional construction to a shaft 32 provided at its lower end with a universal joint 33. Universal joint 33 serves to connect shaft 32 with another shaft 34 which is, in turn, connected to a shaft 35 extending through bearing 36 near the bottom of housing 27. Universal joints 37 and 38 at either end of shaft 35 connect the same to shafts 34 and 39, the latter of which is connected through universal joint 40 to hub 41. It will be realized that shaft 39 may be continuous or made up of a number of sections connected together by universal joints depending upon the relative positions of housing 27 and clutch 13 in the particular installation.

One end of hub 41 is keyed to universal joint 40 and the other end is provided with a socket for the reception of a shaft 42, also connected by a key, see Figures 2, 5, 6 and 7. It is to hub 41 that a cam 43 is affixed for the purpose of actuating a follower 44, and through it a link 45, one end of which is connected to studs 46 extending radially of the clutch operating ring. Thus, through rotation of shaft 41 and hub 42 from handwheel 28, it is possible to slide the clutch operating ring, see Patent 1,392,022, to cause engagement and disengagement of clutch 13.

Cam follower 44 is provided with integral shanks 47 and 48 which are mounted for rotation in bearings 49 and 50 respectively located in registering cylindrical portions 51 and 52 of a housing 53. Housing 53 consists of two similar generally rectangular castings which when bolted together define therebetween a generally oval space sufficient to accommodate cam 43. Registering cylindrical portions 51 and 52 of housing 53 serve to accommodate shanks 47 and 48 of cam follower 44 and the required bearings.

It is now evident that upon rotation of hub 42 cam follower 44 will be moved with respect to the axis of said hub and that because of shanks 47 and 48 the displacement will be imparted to housing 53. Thus, housing 53 is provided with two registering elongated slots 54 and 55, of a length equal to the greatest radius of cam 43, for the accommodation of hub 42 regardless of the relative position of the hub and housing.

The operation of link 45 from cam 43 is effected by connecting a rod 56 to a socket 57 of housing 53 and to one arm of said link. To this end pins 58 are passed through socket 57 and serve to anchor therein one end of rod 56. Intermediate its ends, rod 56 is provided with a hub 59 through which a pin 60 is passed. Upon reference to Figure 7 it can be seen that link 45 is a double armed one and that pin 60 extends from hub 59 to both the upper and lower arms 61 and 62 thereof. Arms 61 and 62 are bifurcated and receive therein sliding blocks 63 and 64 apertured to accommodate the ends of pin 60 for rotation therein. Bolts 65 connect the ends of arms 61 and 62 as can be seen in Figure 5.

Since pin 60 is free to rotate in blocks 63 and 64 it need not rotate in hub 59. Hence it is provided with an integral flange 66 and a threaded zone 67. By this arrangement pin 60 can be held against vertical displacement by simply drawing a nut 68 against the upper edge of hub 59 so that the lower edge may be forced into engagement with flange 66. To maintain the adjustment a lock nut 69 may be employed.

Figure 5:
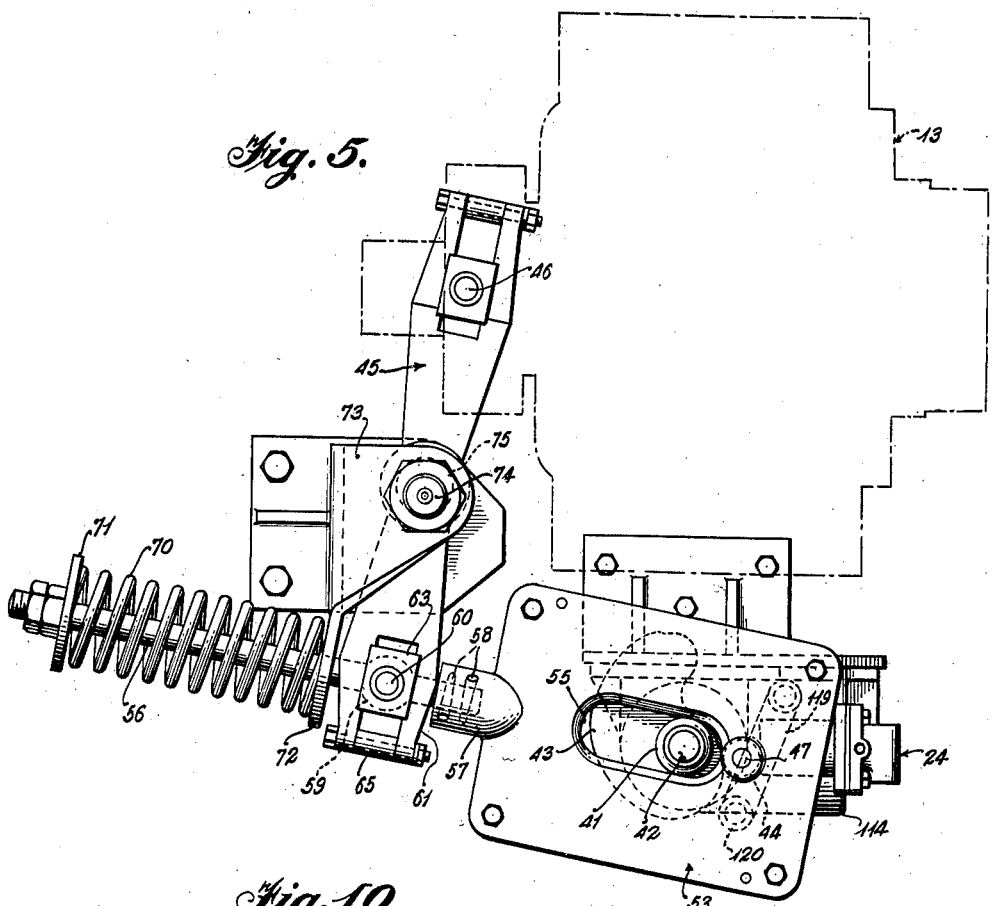
Figure 5 is a top plan view to an enlarged scale of the clutch operating mechanism shown in Figure 2.

When the clutch operating assembly is in the position of Figure 5 the clutch is fully engaged. By counter-clockwise movement of hub 41 gradual disengagement of the clutch can be brought about through the action of cam 43. This action is against the thrust of coil spring 70 compressed between a washer 71 carried on the free end of shaft 56 and a stationary ear 72 of a standard 73. Spring 70 serves to maintain cam and follower contact and serves to engage the clutch as well as to permit even and smooth disengagement thereof. Standard 73 supports a shaft 74 in a cam 75. Shaft 74 constitutes the point of pivot of link 45, cam 75 determining the position of the axis. It can be seen that by turning cam 75 to different positions compensation for wear of the clutch faces is possible.

The shape of cam 43 forms an important part of this invention in that its rise per degree of angular displacement is correlated with the increase in thrust of spring 70 upon compression thereof. Thus, since the thrust of spring 70 increases in direct proportion to decrease in its axial length, the rate of rise of cam 43 is progressively reduced from the point of minimum to the point of maximum radius. This progression is related to the thrust of spring 70 as a variable to a function so that mechanical advantage afforded by cam 43 increases as the thrust of spring 70 increases. The effect of the shape of cam 43 is discernible at handwheel 28 by a constant resistance throughout the entire compression of the spring. Furthermore, the use of a cam allows for a smooth even disengagement of the clutch and a rapid engagement, the latter, of course, resulting from action of spring 70. Clutch 13, of course, is successively engaged and disengaged by unidirectional rotation of cam 43. It is contemplated that some means such as a ratchet and pawl assembly 37a be associated with universal 37 for shaft 34 or with one of the other driving connections for hub 41 to limit said hub to unidirectional movement.

An arrangement similar to the one just described is likewise employed in conjunction with the operation of emergency drum brake 22a. The brake operating arm is moved in an axial sense in response to the rotation of a cam 42a similar to cam 42 but of straight line development. Cam 42a is mounted in a housing 53a including a cam follower 44a similar in construction and function to the arrangement of Figure 7 in connection with the clutch operating cam-follower assembly. Housing 53a, which is bodily movable, is connected to a brake link operating shaft 56a which is connected to brake arm 45a. The manner in which the brake arm may effect the setting and release of the brake is illustrated in Bryan Patent 1,453,126. In the position shown in Figure 13 the brake is in set position. It is quite important that the means used for setting and releasing brake 22a be of a type which may be driven unidirectionally to effect a complete setting and release of the brake in 360° of angular displacement.

The brake cam 42a is driven from a shaft 76 connected by a universal 77 to a shaft 78 which passes through a bearing 79 in the bottom of control station housing 27. As is the case of shaft 39, shaft 76 may be either continuous or made up of a number of sections, depending upon the structural characteristics of the installation and the distance of control housing 27 from brake 22a. In the housing 27 a short shaft 80 connects shaft 78 through a universal 78a to a universal 81 extending vertically downwardly from a gear box 82 similar in structure and operation to gear box 31. A horizontal shaft extends from gear box 82 and brake operating hand wheel 29 is mounted thereon. A ratchet and pawl assembly 78b is associated with universal 78a and serves to limit brake operating wheel 29 and the brake operating cam to unidirectional movement.

The manner of operating clutch 13 and brake 22a has now been described. It is evident that both are operated through cams and that a complete cycle of operation of each can be effected by 360° of angular displacement of the respective cam. Thus, regardless of whether the brake is being set or released or whether the clutch is being engaged or disengaged, rotation is always in the same direction and is, as illustrated, counterclockwise.

Referring now to Figures 3 and 4, there is shown a mechanical interlock between shafts 34 and 80 serving to prevent the release of brake 22a except when clutch 13 is in fully engaged position to establish a driving connection between shafts 18 and 19. On brake shaft 80 there is provided a radially extending dog 83 which extends into the path of an axially slidable pin 84 mounted in bearings 85 and 86 supported conveniently from any portion of housing 27, as, for example, by bracket 87 supporting the bearings through bolts 88 and 89. At its end nearest shaft 80, pin 84 is provided with a diametrical key 90 to which a coil spring 91 is fastened. Coil spring 91 extends between key 90 and the edge of bearing 86. Since bearing 86 is stationary the thrust of spring 91 has a tendency to move pin 84 to the left as it is viewed in Figure 3 so that when dog 83 is in the position shown in that figure pin 84 is urged by spring 91 thereagainst. It is the position of Figure 3 that dog 83 occupies when brake 22a is in set or engaged position. Thus, to release the brake by turning shaft 80 in a counterclockwise direction, it is evident that pin 84 must be displaced to the right against the thrust of spring 91. This movement, however, may be prevented by the edge of a disc 92 mounted on and extending radially outwardly from shaft 34. Disc 92 is provided with a wedge-shaped notch at 93. This notch is located so as to occupy the position shown in Figure 3, when the clutch cam 43 is in the position shown in Figure 6. Thus, when clutch 13 is disengaged, brake 22a may not be released since dog 83 cannot move pin 84 because of the fact that the end of said pin is not engaged with the edge of disc 92. However, when clutch cam 43 is turned from the position shown in Figure 6 to substantially the normal position of Figure 5, thereby causing the clutch to become engaged, the notch at 93 is turned slightly about 90° and is then in the position shown in the broken lines of Figure 3. In that position brake 22a may be released, since dog 83 may then compress spring 91 and force pin 84 into the notch 93. The notch at 93, of course, is of sufficient depth to allow dog 83 to clear the end of pin 84.

While from the foregoing it is evident that brake 22a may not be released except when clutch 13 is engaged, the brake may be set at any time, regardless of the position of the clutch. For example, if the brake cam is substantially of the same shape as cam 43, when the brake is in released position, dog 83 will occupy the broken line position in Figure 3. Thereafter, if it is moved further in a counterclockwise direction, the brake is set to the completely engaged position at which time the dog is as shown in full lines in Figure 3. Thus, the interlock described is a very important safety feature since by its use accidental release of the brake 22a when the clutch 13 is not engaged is impossible while desired setting of the brake under emergency conditions can be effected at any time.

It has been previously stated that as a further safety feature in connection with the operation of hoist equipment constructed in accordance with this invention an arrangement is provided to prevent the disengagement of clutch 13 so long as a positive pressure of a predetermined value exists in line 36 connecting the "A" and "B" ends of hydraulic transmission 12. This arrangement, shown schematically in Figure 1, is illustrated in greater detail in Figures 2, 8, 9 and 10. It will be recalled that hub 41, to which clutch operating cam 43 is attached, is mounted on a shaft 42 which is turned through intermediate connections by handwheel 28 to effect setting and release of the clutch. Below hub 41 shaft 42 passes through a bearing 94. Shaft 42 projects below bearing 94 and carries thereon two discs 95 and 96. These discs are keyed to shaft 42 for turning movement therewith. Disc 95 is substantially circular and is provided with a single radial notch at 97. This notch is intended for cooperation with the end of a shaft 98 which may be hydraulically projected from interlock 24. The arrangement is such that the notch at 97 will be in registry with shaft 98 when the clutch operating cam is in the position of Figure 5, i. e., when the clutch is fully engaged. Obviously, to release clutch 13 it is necessary to turn cam 43, hub 41 and shaft 42 in counterclockwise direction. This movement is prevented if shaft 98 is projecting into notch 97 as illustrated in Figures 8 and 9.

Figure 10:
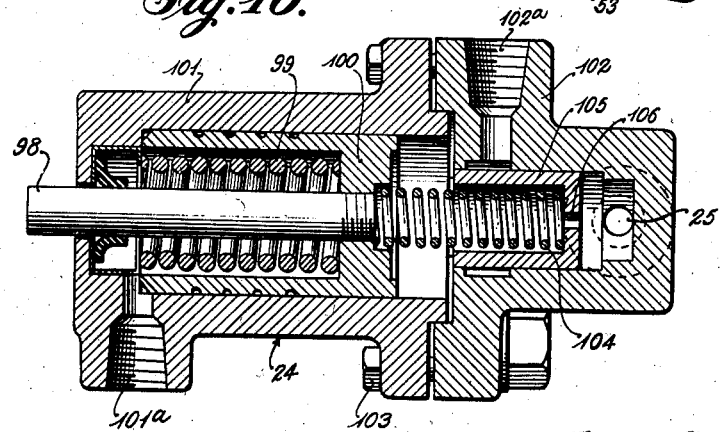
Figure 10 is a view in section of a hydraulic piston and valve arrangement which constitutes the clutch cam shaft locking means shown in part in Figure 9.

Inasmuch as it is desirable to lock clutch 13 against release only when hydraulic pressure in line 25 is in excess of a predetermined value shaft 98 is normally urged to retracted position by a spring 99 (see Figure 10) and may be projected by a piston 100 which is rendered responsive to the pressure in conduit 25. To this end interlock 24 consists of two housings, 101 and 102, held together by bolts 103. Housing 101 defines an interior cylindrical working space adapted to receive piston 100 for sliding movement therein. Piston 100 is hollowed for the reception of spring 99 and has an axial opening interiorly threaded for the reception of the exteriorly threaded end of pin 98 so that piston 100 and pin 98 will move axially as a unit in the cylinder defined by housing 101. Spring 99, located in the hollow interior of piston 100, serves to urge the same to the right as viewed in Figure 10. This thrust is counteracted to a certain extent by a smaller and weaker spring 104 extending from a hollow piston 105 mounted in a cylinder defined by housing 102. The cylinder defined by housing 102 is in direct communication with fluid conduit 25. The cylinder defined by housing 101 is also in communication with fluid conduit 25 through a small aperture 106 in piston 105. As can be seen in Figure 10, housing 102 is provided with a drain-off connection 102a extending radially inwardly and communicating with the working space for piston 105. A similar connection 101a is provided in housing 101; this connection communicating with the working space for piston 100. It can be seen that piston 105 functions as a shuttle valve to close and open connection 102a at the proper time. Figure 10 illustrates the position taken when pressure exists in line 25 at a value equal to or above 300 pounds per square inch. Under these conditions piston 105 is forced over to the left of Figure 10 so as to close drain-off connection 102a. Thus, the chamber defined by housing 101 and piston 100 is filled from pipe 25 through aperture 106. When, however, the pressure in line 25 falls below 300 pounds per square inch, spring 99 forces piston 100 to the right, as viewed in Figure 10, which in turn forces piston 105 to the right opening drain-off 102 to allow the entrapped oil behind piston 100 to escape. The purpose of drain-off 102a is, therefore, to avoid a time lag in the release of piston 100. The liquid escaping through aperture 102a may be returned to the hydraulic system in any convenient manner. Drain-off 101a serves to allow escape of any liquid which may leak past piston 100 preventing the occurrence of trapped oil in the chamber occupied by spring 99 which would prevent or delay the ejection of pin 98 to locking position. It can now be seen that if no pressure of sufficient value exists in conduit 25 spring 99 will overcome the thrust of spring 104 and cause pin 98 to be retracted to such an extent that disc 93 is free to turn.

Regardless of the hydraulic pressure existing in line 25, it is always possible to move clutch 13 to engaged position since the frictional bearing of pin 98 against the edge of disc 95 will not be sufficient to interfere to any appreciable extent with the rotation of the latter.

From the foregoing explanation of interlock 24, it is now evident that when the pump end of transmission 12 is stroked in a hoisting direction the pressure in line 26 will be relatively high depending upon the resistance offered by the load on the cable attached to winding drum 10. Naturally, the adjustment of the springs in interlock 24 will be correlated with the type of load to be lifted, the 300 pounds per square inch pressure mentioned hereinbefore being contemplated for the hoisting of aircraft. In paying out an empty hook the pressure in line 26 will be very low, but, in that event, if clutch 13 were inadvertently disengaged, no damage would result. In paying out a load, the pressure value in line 26 will be maintained relatively high because of the tendency of the motor end to drive the pump end. Here again the pressure reached will be dependent upon the setting of the transmission and the weight of the load. From the foregoing it is equally evident that when a load is stationary but suspended from the cable, a pressure of sufficient value will exist in line 25 so that interlock 24 will be actuated to prevent the release of clutch 13.

It has been previously explained that this invention, in addition to contributing to safety in the operation of hoist equipment, involves an arrangement to assist in the smooth and easy hoisting of aircraft off of a rough seaway. This feature of the invention resides in the manner of operation of automatic tensioning torque motor 23, the structure and function of which is described in applicant's Patent 2,042,480. Torque motor 23 is a three-phase A. C. motor connected to a source 107 by connectors 108, 109 and 110, see Figure 1. A main switch 111 controls the flow of power from source 107 to motor 23. This switch is operated by a solenoid 112 in a control circuit connected to electrical conductors 108 and 109. One branch of the control circuit leads directly from electrical conductor 109 to solenoid 112. The other branch passes from conductor 108 to relay coil 113, from thence to a switch 114 and then back to a connection at 115 which leads to conductor 109. A branch line 116 is interposed between the point of connection of the control circuit to conductor 108 and the point of connection of relay coil 113. Line 116 passes through relay contacts 117 and from thence through a switch 118 back to solenoid 112. Switch 118 is the main controlling element for torque motor 23 and may be conveniently located as, for example, on housing 27. In the "on" position, automatic tensioning can occur, while in the "off" position the control circuit cannot be operated to cause operation of switch 111.

In the employment of the described circuit, see Figures 8 and 9, switch 114 is opened and closed by an arm 119 carrying a follower 120 urged by means not shown into engagement with disc 96. Disc 96, it will be recalled, is keyed to shaft 42 which turns with clutch operating cam 43. This disc is provided with a cut-out portion shown in broken lines in Figure 8 so that in one portion of its cycle of movement arm 119 will be in one position while in the remainder of the cycle it will be in another. The position of arm 119 in Figures 8 and 9 is the position taken when switch 114 is open. In other words, when clutch 13 is engaged in driving position, in either direction, torque motor 23 is de-energized regardless of the position of master switch 118. However, if master switch 118 is at the "on" position and the motor end of hydraulic transmission 12 is being run in the paying out direction, motor 23 will not operate so long as clutch 13 is engaged. However, after the hook has been lowered and after the aircraft is attached for hoisting, clutch 13 will be disengaged. This will result in counterclockwise movement of disc 96 away from the position shown in Figure 8 which will cause immediate movement of follower 120 to effect the closing of switch 114, thus energizing relay coil 113 to close switch 117 thereby energizing the control circuit which will, through solenoid 112, close switch 111 and start torque motor 23. Torque motor 23 then turns shaft 19 in the hoisting direction to take up any cable slack which may exist after the hook is attached to the load but prior to commencement of hoisting. From a consideration of cam 43 in Figure 5 it will be seen that approximately 270° of movement in a counter-clockwise direction is required in order to reach the position of Figure 6. In other words, the full disengagement of clutch 13 requires about 270° of movement of shaft 42. Since disc 96 is keyed to and turns with shaft 42, it will be subject to the same angular displacement. Switch 114, however, is closed instantly at the initiation of the clutch release and long before the clutch is fully disengaged. The purpose of this is to permit control of the acceleration of the hoisting line by manually regulating the drag of clutch 13 for it would be quite undesirable to allow the hoisting line to be taken up instantly upon closing the circuit to motor 23. Thus, it is that any slack in the cable existing at the time motor 23 is automatically turned on through operation of switch 114 is gradually eliminated as clutch 13 is gradually biased to its fully opened position. While, as explained in Patterson Patent 2,042,480, the power of motor 23 is sufficient to eliminate slack in a hoisting cable, it is not sufficient to overcome the weight of an airplane or other heavy load so that relative movement of a ship or plane away from one another will result in reversal of motor 23. On the other hand, when hoisting is commenced and the movement of clutch 43 is toward engaged position, only about 90° of movement is required. It is for this reason that the cut-out portion of disc 96 approximates an amplitude of 90° so that arm 119 will be caused to move radially inwardly to move switch 114 to open position immediately upon engagement of the clutch. In this case, the control circuit is held closed, however, by switch 117 which is of the delayed opening type such as that shown in publication number 6306, Cutler-Hammer, at page 1. Thus, during the initial hoisting stages motor 23 is operating in a hoist direction and adds its force to that of motor 11 operating through the motor end of transmission 12. As a consequence, if wave action should cause relative movement of the ship and plane toward one another at a rate faster than the drum speed, the cable slack would be taken up immediately by torque motor 23 acting in conjunction with the automatic accelerating devices on the hydraulic transmission 12. By having torque motor 23 energized prior to the commencement of hoisting, there is a tendency to eliminate a time lag that occurs when using hydraulic transmission accelerating devices since the torque of motor 23 is immediately available for hoisting and therefore assists the acceleration of the transmission. After the hoisting has progressed for a distance sufficient to insure clearance of the water, motor 23 is disengaged by the automatic opening of switch 117. Obviously, the time delay factor for switch 117 may be varied as desired for various operating conditions.

Figure 11:
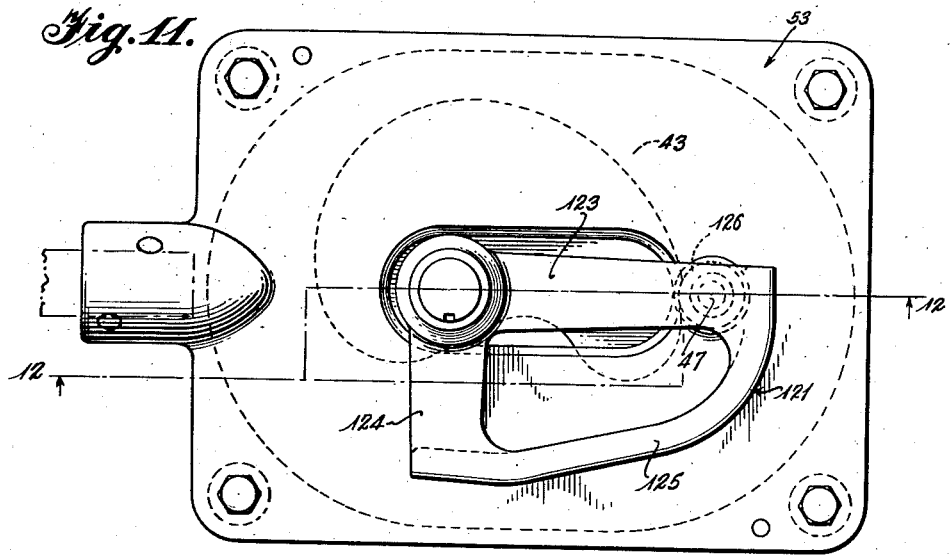
Figure 11 is a view similar to Figure 6 of a modified type of clutch operating cam assembly.
Figure 12:
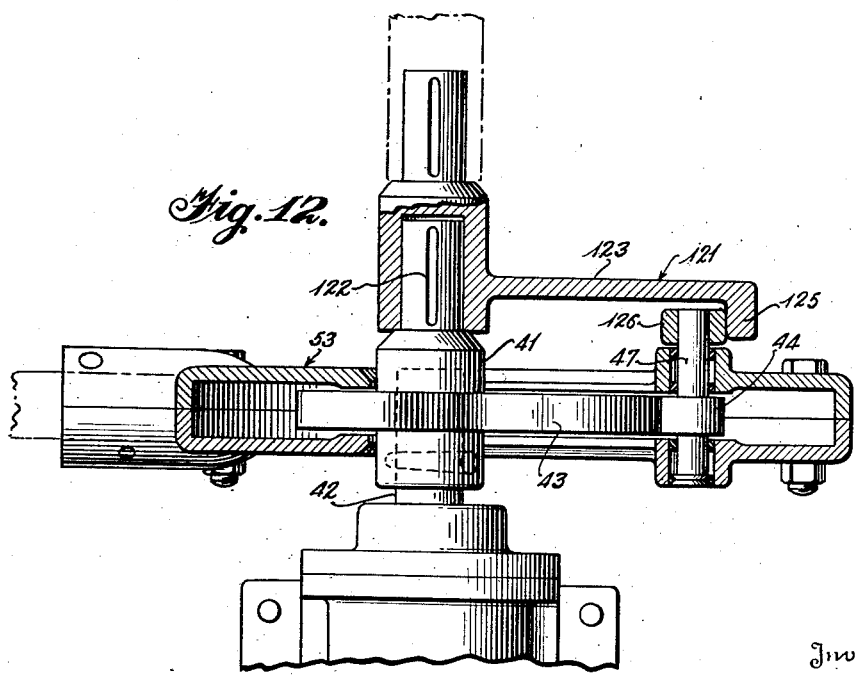
Figure 12 is a view in section taken along the line 12—12 of Figure 11.

Referring now to Figures 11 and 12, there is shown a modified type of cam assembly used for the actuation of clutch 13. This assembly includes all of the parts shown in Figures 6 and 7 and additionally a normally inoperative construction for effecting the engagement of clutch 13 should spring 70 be broken under emergency conditions. It will be recalled that the clutch is successively engaged and disengaged by rotation of cam 43. Cam follower 44 is held against cam 43 by a spring 70. Thus, in approximately 90° of counterclockwise movement away from the position of Figure 6, cam 43 assumes the position shown in Figure 5. Follower 44 and the entire housing 53 have thus been moved to the left as shown in Figure 5 to effect engagement of the clutch. During this operation, cam 43 does not act directly upon follower 44 but rather follower 44 is released and caused to follow the contour of the cam by action of spring 70. From this it is evident that were spring 70 to break while the clutch were disengaged, it would be impossible to engage the same since no force would exist to bias the housing 53, shaft 56 and blocks 63 and 64 in a clockwise direction about pivot point 74. Of course, the problem of releasing the clutch would not present difficulties since the action of cam 43 on follower 44 is positive during the release cycle.

In the construction of Figures 11 and 12 a cam 121 is keyed at 122 to hub 41. Cam 121 has two radially extending arms 123 and 124 disposed some 90° apart. These arms are connected by a downwardly depending flange 125 intended to act upon a cam follower 126 disposed on the upper extremity of follower shank 47 which is somewhat elongated for this purpose. Upon reference to Figure 12, it will be noted that principal cam follower 44 and cam follower 126 are thus arranged coaxially and in alignment. The rise of flange 125 is so arranged that follower 126 will be its maximum distance from hub 41 when clutch cam 43 is in release position and its minimum distance from said hub when cam 43 is in clutch engaged position.

It will be understood that cam 121 is normally inoperative. So long as spring 70 is in operating condition, the clutch will be engaged and disengaged as described in conjunction with Figures 6 and 7. If the spring breaks, however, cam 121 will have a positive action with respect to follower 126 and will draw said follower toward the axis of hub 41 thereby displacing shaft 56 to the left to effect engagement of clutch 13. Since the clutch is normally engaged by the spring, breakage of the latter will be evidenced at the control wheel by considerable increase in resistance.

Having now described the invention in its preferred form, it is understood that variations and modifications may be made therein without departing from the spirit of the invention, and it is desired that the scope thereof be limited only by the appended claims.

What is claimed is:

1. Hoisting apparatus comprising, a cable drum, a brake therefor, brake operating means, hydraulic means for driving said drum, a clutch interposed between said driving means and said drum, means for operating said clutch to and from engaged position, means responsive to the position of said clutch operating means for preventing operation of said brake-operating means to release said brake except when said clutch is in engaged position, and means responsive to a predetermined pressure in said hydraulic means for locking said clutch in engaged position, whereby load safety is insured since the drum brake cannot be released except when the clutch is in driving position and the clutch cannot be released so long as the pressure in said driving means is above a predetermined value.

2. Hoisting apparatus comprising, a cable drum, a drum brake, brake operating means, means including a hydraulic transmission for driving said drum, said transmission including a driving end and a driven end, a normally engaged clutch interposed between said driven end and said drum, means for disengaging said clutch, means responsive to the position of said clutch disengaging means for preventing operation of said brake operating means to release position except when said clutch is in normal position, and means responsive to hydraulic pressure of a predetermined value between the driving and driven ends of said transmission for locking said clutch in normal position, whereby load safety is insured since the drum brake cannot be released except when the clutch is in driving position and the clutch cannot be released so long as a predetermined pressure exists between the driving and driven ends of said transmission.

3. Hoisting apparatus comprising, a cable drum, a normally released brake therefor, means for driving said drum, a normally engaged clutch interposed between said driving means and said drum, separate means both restricted to cyclic unidirectional rotative movement for disengaging said clutch and for setting said brake, means for locking the brake setting means in one angular position, and means responsive to on angular position of said clutch releasing means for rendering said locking means inoperative, the means responsive to one angular position of the clutch releasing means including a portion of the brake locking means, whereby a brake-clutch interlock may be provided in which the brake may be released only when the clutch is in engaged position while the brake may be set at any time.

4. Hoisting apparatus comprising, a cable drum, a brake therefor, means for driving said drum, a clutch interposed between said driving means and said drum, a cam for operating said clutch, a cam for operating said brake, each of said cams effecting a complete cycle of movement of the parts operated thereby each 360° of angular displacement, shafts for operating said cams, means for restricting said shafts to movement in one direction only, a notched disc on said clutch operating cam shaft, a projection extending radially from said brake operating cam shaft, and a pin engaging the edge of said disc and normally held thereby in the path of said projection, to prevent rotation of said brake cam shaft but adapted to be urged into the notch of said disc by said projection in one position only of said clutch cam shaft, whereby to effect an interlock between the brake and clutch in which the brake cam shaft may not be turned to release position except when the notch is in registry with the pin but wherein it may move to set position regardless of the angular position of said notch.

5. Automatic tensioning hoist apparatus comprising, a cable drum, a clutch having a driving side and a driven side, the latter being operatively connected to said drum, means for actuating the driving side of said clutch, a torque motor on the driven side of said clutch adapted to operate said drum in a hoisting direction when resistance to operation is below a predetermined magnitude, means for operating said clutch to and from engaged position, and means responsive to movement of said clutch operating means to clutch disengaging position for energizing said torque motor, whereby when the clutch is disengaged after paying out a cable tension will be automatically maintained by the energization of said torque motor.

6. Automatic tensioning hoist apparatus comprising, a cable drum, a clutch having a driving side and a driven side, the latter operatively connected to said drum, means for actuating the driving side of said clutch, a torque motor operating on the driven side of said clutch and adapted to operate said drum in a hoisting direction when resistance to operation is below a predetermined magnitude, unidirectional rotatable cam means for quickly engaging and slowly disengaging said clutch, and means responsive to initial movement of a rotating portion of said cam means in its clutch releasing cycle for energizing said torque motor, whereby the torque on said drum may be gradually applied by manipulation of said clutch to gradually reduce the loading on the torque motor.

7. Automatic tensioning hoist apparatus comprising, a cable drum, a clutch having a driving side and a driven side, means for actuating the driving side of said clutch, automatic means responsive to a reduction in load on said driving means for increasing the speed thereof, a torque motor on the driven side of said clutch adapted to operate said drum in a hoisting direction when resistance to operation is below a predetermined magnitude, means for operating said clutch to and from engaged position, a circuit controlling the operation of said torque motor, a switch in said circuit operated by said clutch operating means and responsive to the position thereof to hold said circuit open except when said clutch operating means is moved to disengaging position, and a delay opening switch in said circuit adapted to be closed upon the closing of said circuit and to open a predetermined period after the opening of said first switch, whereby when said clutch is disengaged said torque motor is energized while the engagement of said clutch will not immediately result in the de-energization of said motor so that the hoisting torque of the latter may assist said means for actuating the driving side of said clutch in acceleration to take up cable slack if the load and drum are relatively moved toward one another at a rate in excess of the normal takeup speed of the drum.

8. Automatic tensioning hoist apparatus comprising, a cable drum, a clutch including a driving side and a driven side operatively connected to said drum, means including a hydraulic transmission having "A" and "B" ends for actuating the driving side of said clutch, means responsive to a reduction in load for increasing the effective speed of said "B" end, a torque motor on the driven side of said clutch adapted to operate said drum in a hoisting direction when resistance to operation is below a predetermined magnitude, means for operating said clutch to and from engaged position, and means set in operation by said clutch operating means for energizing said torque motor upon disengagement of said clutch and for de-energizing said torque motor a predetermined period after engagement thereof, whereby to afford a time lag intermediate the clutch engagement and the de-energization of the torque motor so that the hoisting torque of the latter will continue for a short period after hoisting commences to assist in the assumption of a high "B" end speed on the part of the transmission to compensate for possible overhauling of a water-borne load by a wave which would otherwise cause slack in the line.

9. Hoisting apparatus comprising, a cable drum, a brake therefor, brake operating means, means including a hydraulic transmission for driving said drum, said transmission including a driving end and a driven end, a normally engaged clutch interposed between the driven end of said transmission and said drum, a cam for operating said clutch to and from engaged position, a torque motor operatively connected to said drum and adapted to drive the same in a hoisting direction when resistance to operation is below a predetermined magnitude, a shaft for operating said clutch cam, interengaging elements for locking said clutch in engaged position, one of said interengaging elements being movable to a position to be engaged by the other in response to angular displacement of the clutch cam operating shaft to its clutch engaging position, normally interengaging elements for locking said brake operating means against movement to release position, one of said normally interengaging elements being movable out of engaging position in response to angular displacement of the clutch cam operating shaft to its clutch engaging position to permit release of said brake, and means responsive to angular displacement of said clutch cam operating shaft away from clutch engaging position for effecting the energization of said torque motor.

10. In hoisting apparatus including a cable drum, means including a hydraulic transmission for driving the same, and a torque motor adapted to operate said drum in a hoisting direction when resistance to operation is below a predetermined magnitude, a friction clutch interposed between said transmission and said drum, a spring normally biasing said clutch to engaged position, a positive linkage including a cam follower for disengaging said clutch against the thrust of said spring, a cyclic cam in operative relation with said follower, said cam having a zone of rise and a zone of fall to successively positively disengage and permit the spring to engage said clutch, the angular magnitude of the zone of rise being substantially greater than that of the zone of fall, the rise of said cam per degree of angular displacement thereof decreasing at a rate correlated with the increase of thrust of said spring upon compression thereof, so that a constant ratio of power to resistance is maintained throughout the entire clutch releasing cycle permitting the use of a spring of sufficient thrust to hold the clutch engaged, and means responsive to initiation of clutch disengagement by said cam for energizing said torque motor.

11. In hoisting apparatus including a cable drum, means including a hydraulic transmission for driving the same, and a torque motor adapted to operate said drum in a hoisting direction when resistance to operation is below a predetermined magnitude, a friction clutch interposed between said transmission and said drum, a spring normally biasing said clutch to engaged position, a positive linkage including a cam follower for disengaging said clutch against the thrust of said spring, a cyclic cam in operative relation with said follower, said cam having a zone of rise and a zone of fall to successively positively disengage and permit the spring to engage said clutch, the angular magnitude of the zone of rise being substantially greater than that of the zone of fall, the rise of said cam per degree of angular displacement thereof decreasing at a rate correlated with the increase of thrust of said spring upon compression thereof, positive means for operating said cam follower in a clutch engaging direction independent of said spring, said positive means moving with said cam and acting in its zone of fall to bias the cam in the direction toward which it is drawn by said spring, so that upon breakage of said spring manual engagement of the clutch is possible, and means responsive to initiation of clutch disengagement by said cam for energizing said torque motor.

JOSEPH C. PATTERSON, JR.

CERTIFICATE OF CORRECTION.

Patent No. 2,335,079. November 23, 1943.

JOSEPH C. PATTERSON, JR.

It is hereby certified that error appears in the printed specification of the above numbered patent requiring correction as follows: Page 6, second column, line 68, claim 3, for "on" read --one--; and that the said Letters Patent should be read with this correction therein that the same may conform to the record of the case in the Patent Office.

Signed and sealed this 4th day of January, A. D. 1944.

(Seal)
Henry Van Arsdale,
Acting Commissioner of Patents.